(12) United States Patent
Neuer et al.

(10) Patent No.: US 9,726,766 B2
(45) Date of Patent: Aug. 8, 2017

(54) METHODS AND DATABASES FOR IDENTIFYING NUCLIDES

(75) Inventors: Marcus Neuer, Düsseldorf (DE); Yong Kong, Solingen (DE); Ralf Lentering, Solingen (DE); Jürgen Stein, Wuppertal (DE)

(73) Assignee: FLIR DETECTION, INC., Wilsonville, OR (US)

( * ) Notice: Subject to any disclaimer, the term of this patent is extended or adjusted under 35 U.S.C. 154(b) by 1048 days.

(21) Appl. No.: 13/989,940

(22) PCT Filed: Nov. 29, 2010

(86) PCT No.: PCT/EP2010/068448
§ 371 (c)(1),
(2), (4) Date: Oct. 8, 2013

(87) PCT Pub. No.: WO2012/072103
PCT Pub. Date: Jun. 7, 2012

(65) Prior Publication Data
US 2014/0025341 A1    Jan. 23, 2014

(51) Int. Cl.
*H03F 1/26* (2006.01)
*H04B 15/00* (2006.01)
(Continued)

(52) U.S. Cl.
CPC .............. *G01T 1/17* (2013.01); *G01V 5/0008* (2013.01)

(58) Field of Classification Search
CPC ........ G01V 5/101; G01V 5/102; G01V 11/00; G01V 5/125; G01V 3/32; G01V 5/104;
(Continued)

(56) References Cited

U.S. PATENT DOCUMENTS

2007/0001123 A1  1/2007  Andrews et al.
2008/0175351 A1  7/2008  Norman et al.
(Continued)

FOREIGN PATENT DOCUMENTS

CN   1774731 A   5/2006
RU   2129289     4/1999
(Continued)

OTHER PUBLICATIONS

"The use of energy windowing to discriminate SNM from NORM in radiation portal monitors" James Ely, et al., Received Dec. 13, 2005; received in revised form Jan. 12, 2006; accepted Jan. 17, 2006, Available online Feb. 13, 2006, pp. 373-387.
(Continued)

*Primary Examiner* — Roy Y Yi
(74) *Attorney, Agent, or Firm* — Haynes and Boone, LLP (57) ABSTRACT

A method for correctly identifying at least one source, in particular at least one nuclide, enclosed in a human body and/or a container, is provided, the method comprising the following steps: detecting and measuring the at least one source by means of a gamma spectroscopic device; identifying, in a first estimation step, the at least one source by means of a standard nuclide identification procedure for evaluating a measured first spectrum of the at least one source; applying a second estimation step on the basis of the result of the first estimation step, wherein the result of the first estimation step is used for acquiring a plurality of second spectra of the at least one source found by the standard nuclide identification procedure for a plurality of absorption scenarios and for a plurality of scattering scenarios; and comparing the measured first spectrum with a scatter and absorber spectrum obtained from the plurality of second spectra generated in the second estimation step.

21 Claims, 10 Drawing Sheets

(51) Int. Cl.
*G01T 1/17* (2006.01)
*G01V 5/00* (2006.01)

(58) Field of Classification Search
CPC .......... G01V 5/045; G01V 5/08; G01V 99/00;
G01V 1/40; G01V 5/10; G01V 11/002;
G01V 13/00; G01V 2200/16; G01V 2210/66
See application file for complete search history.

(56) References Cited

U.S. PATENT DOCUMENTS

| | | | | | |
|---|---|---|---|---|---|
| 2009/0001262 | A1* | 1/2009 | Visser | ................ | H01J 49/0036 250/282 |
| 2010/0290587 | A1* | 11/2010 | Umstadter | ........... | G01V 5/0016 378/57 |
| 2010/0305873 | A1* | 12/2010 | Sjoden | .................... | G01T 1/362 702/30 |

FOREIGN PATENT DOCUMENTS

| | | |
|---|---|---|
| RU | 2300096 | 5/2007 |
| RU | 2349906 | 3/2009 |
| WO | WO 2004/090829 A1 | 10/2004 |
| WO | WO 2005/059594 | 6/2005 |
| WO | WO 2007/107765 A1 | 9/2007 |

OTHER PUBLICATIONS

"Is the Holy Grail Plastic? Radiation Identification from Plastic Scintillators" Laura J.C. Butchins, et al., Manuscript received May 9, 2009.

International Search Report mailed Aug. 19, 2011, issued in corresponding International Patent Application Serial No. PCT/EP2010/068448.

James Ely et al., The Use of Energy Windowing to Discriminate SNM from NORM in Radiation Portal Monitors, Published in Nuclear Instruments & Methods in Physics Research Section A: Accelerators, Spectrometers, Detectors, and Associated Equipment, Article, May 10, 2006, pp. 373-387, vol. 560, Issue 2, Published by Elsevier B.V., Richland, WA, U.S.

Laura J. C. Butchins et al., Is the Holy Grail Plastic? Radiation Identification from Plastic Scintillators, Published in Advancements in Nuclear Instrumentation Measurement Methods and Their Applications 2009 First International Conference, Article, Jun. 7, 2009, pp. 1-4, Published by IEEE, UK.

* cited by examiner

METHODS AND DATABASES FOR IDENTIFYING NUCLIDES

CROSS-REFERENCE TO RELATED APPLICATIONS

This application is a national stage application of PCT Application No. PCT/EP2010/068448, filed Nov. 29, 2010, in the World Intellectual Property Office, the disclosure of which is incorporated herein by reference.

BACKGROUND OF THE INVENTION

1. Field of the Invention

The present invention relates to methods and databases for identifying nuclides.

2. Description of the Related Art

In prior art, for radiation detection, various gamma spectroscopic devices are known, as for example, digital gamma spectrometers which allow a user to locate a radioactive or nuclear source, and, once found, to identify the isotope or isotope thus detected.

Such radiation detectors are employed—amongst others—for aviation security, border security, and facility security. Especially in view of modern defense strategies against nuclear terrorism, gamma spectroscopic surveillance of vital infrastructure has become a cornerstone. Facing an increasingly globalized world, illicit traffic of special nuclear materials is an urgent threat to our societies. As a matter of fact, sensitive locations are secured by applying two complementary detector types regarding to radiation: (a) stationary portals and (b) handheld instruments.

In devices known from prior art, both types acquire spectra and are thus principally capable of identifying the nuclides that contribute to the radiation wherein for nuclide identification, two concepts are known: peak search and template matching. The central objective of devices that apply nuclide identification is to correctly identify all sources in sight of the device. Threat materials denoted as special nuclear material (SNM), e.g., Uranium or Plutonium, are high priority sources that should be found in any circumstances.

A prototypical difficulty in such surveillance scenarios are travelling radiologic patients. Due to their treatment, those people are contaminated with high doses of short living isotopes, like Tc-99m or I-131, but should in general not be regarded as a threat. Consequently, the results of nuclide identification algorithms are mapped by a threat decision, that designates which nuclide is regarded as innocent or threat. In a special sense, these patients are challenging for nuclide identification algorithms, since most of the source is distributed throughout human tissue, and the radiation is heavily scattered.

This scattering distortion leads to various problems. First of all, as mentioned above, nuclides are not identified correctly, as peaks are missing or have low intensity. Secondly, masked nuclides, especially SNM, are not identified correctly due to scattering; and, also, the confidences for the found nuclides are not correct. Evidently, these problems have a direct effect on the performance with SNM.

Additionally, a new question arises with the medical sources that are initially assumed to be innocuous: Is the medical source contained in a human body or not? If the source is not inside the human body, the medical material is very likely to be shipped illegally.

Known gamma spectroscopic devices which are employed, for example, for homeland security applications and which are implemented as handheld instruments as well as portal concepts have a threat mapping for assorted nuclides, as outlined above. They deploy a nuclide identification algorithm and propagate its result to the user.

However, current technologies do not consider the above mentioned scattering caused, for example, by human body tissue and, in principle, cannot uncover sources that are masked by the scattering trace. Further, known nuclide identification algorithms principally do not consider absorption corrections either so that these algorithms are not capable of predicting the amount of attenuation. This, in turn, leads to incorrect results, and, thus, to high security vulnerability.

SUMMARY OF THE INVENTION

Therefore, it is an object of the present invention, to provide methods and systems which produce highly accurate and reliable results in the determination of nuclides which are surrounded and/or contained in any kind of other material, as, for example, human tissue causing scattering, or containers, for example, made from a shielding material.

This object is solved according to the present invention by a method and a database according to the respective independent claim. Preferred embodiments of the present invention are defined in the respective dependent claims.

Thus, by the present invention, a technique is applied that helps to learn about the surrounding circumstances of nuclide measurement and it gives quantitative values that can be used as an indicator for the strength of shielding and the amount of scattering. Specifically, according to the present invention, a procedure is provided that resolves absorption as well as scattering from a given measured spectrum, and, thereby, the information gained during the reconstruction gives a clue in which housing or surrounding the source eventually is positioned, and, thus, renders a very accurate and reliable result.

According to a preferred embodiment, the method further comprises a step of reconstructing the measured first spectrum $\mu(E)$ synthetically.

According to another preferred embodiment, the step of reconstructing the measured first spectrum $\mu(E)$ synthetically is based on data obtained from the step of applying a second estimation step.

Advantageously, the standard nuclide identification procedure is based on a peak search method or on a pattern matching method.

According to still another preferred embodiment, the step of acquiring a plurality of second spectra is based on a simulation procedure. The advantage of this procedure is that it does not need prior calibration measurements as this part is replaced by the simulation.

Alternatively, the step of acquiring a plurality of second spectra may also be based on measurements.

Further, it is preferred that the simulation procedure involves simulating at least one response matrix with radiation transport code, the radiation transport code using a Monte Carlo approach to render particle and wave trajectories, wherein the at least one response matrix is a representation of the physically deposited energy in the gamma spectroscopic device.

According to yet another preferred embodiment a plurality of absorption response matrices is simulated in the simulation procedure with absorbers that cover a range of attenuation from 100% transmission to <1% transmission. Thereby, nearly the entire range is covered nearly completely. In particular, a range from total transmission, thus reflecting a vacuum or air-like absorber, up to high amounts of attenuation was simulated by modeling scenarios with different absorbers. The use of a wide range of transmission and multiple absorbers makes sure, that the measured spectrum, de-facto being an arbitrary absorber and scatterer, can be reconstructed, e.g. as superposition, from the limited set of simulated data. The number of simulations therefore represents the number of discretization points in the absorption space and is directly affecting the precision of the technique.

According to still a further preferred embodiment, a plurality of scattering response matrices is simulated in the simulation procedure. Preferably, the simulation of a plurality of scattering response matrices is carried out parallel to the simulation of the plurality of absorption response matrices.

Also, according to a preferred embodiment, the plurality of absorption and scattering scenarios are simulated based on a geometrical and physical model of the gamma spectroscopic device, wherein the physical and geometrical model of the gamma spectroscopic device includes the resolution of the scintillation radiation detector without electronics, scattering between the scintillation radiation detector and a source; absorption by attenuating materials, and/or the geometry of the source and the scintillation radiation detector.

According to another preferred embodiment, for each absorption response matrix a simulated spectrum is acquired.

Preferably, the simulated spectra from the absorption response matrices are combined as column vectors into a matrix F.

It is also preferred that for each scattering response matrix a simulated spectrum is acquired.

According to yet another preferred embodiment, the simulated spectra from the scattering response matrices are combined as column vectors into a matrix M.

Advantageously, the new first matrix and the new second matrix are combined to obtain a feature matrix F which is used to retrieve new information about the measured spectrum $\mu(E)$ by finding the most probable combination of feature matrix rows that provides a best fit to the measured spectrum $\mu(E)$. Thus, the above approach makes use of a series of response matrices that were simulated for a specific detector. Based on the nuclide identification result, the feature matrix is composed wherein absorption and scattering effects are represented by an assorted list of variants.

Preferably, the most probable combination of feature matrix rows is found by solving an inversion problem, in particular, by applying one a standard least-squares technique, a non-negative least-squares inversion, or a genetic algorithm. This procedure allows for fast processing. Using the inversion technique, quantitative values of the spectrum distortion are derived that help to remotely reconstruct the measurement synthetically.

According to a particularly preferred embodiment, an operator L is defined to be a non-negative least-square operator which solves the inversion problem of the feature matrix resulting in a result vector $\alpha$ containing the most probable combination of feature matrix rows to reproduce the measured first spectrum $\mu(E)$, wherein the result vector $\alpha$ is the scatter and absorber spectrum, in particular, a material spectrum.

In yet another preferred embodiment, the synthetic simulated spectrum is reconstructed from the result vector.

Advantageously, the gamma spectroscopic device is a scintillation radiation detector, in particular, a handheld detector.

The above features and advantages of the present invention will become more apparent upon reading the following detailed description along with the accompanying drawings.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In general, the method for identifying at least one radiating source, in particular at least one nuclide, in an at least partially surrounding medium, which may be a human body and/or a container, comprises the following steps:

estimating at least one radiating source in a measured spectrum $\mu(E)$ by means of a predetermined gamma spectroscopic device;

comparing the measured spectrum with absorption spectra and scattering spectra from a database comprising data representing spectra for a plurality of absorption scenarios and for a plurality of scattering scenarios related to the at least one estimated source;

determining, on the basis of the compared scenarios, information $\alpha$ relating to the material x by which the radiating source is enclosed.

Figure 1:
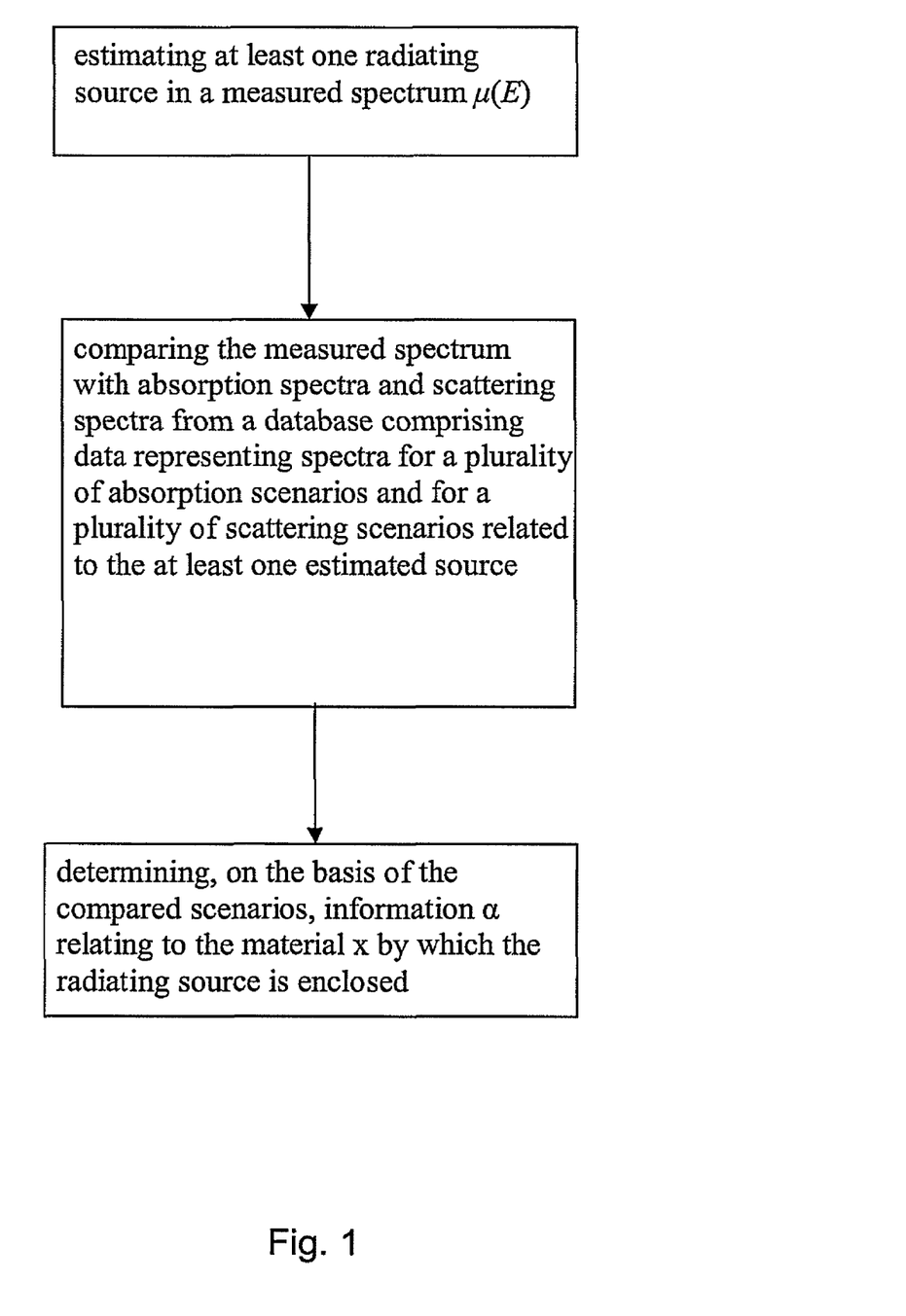
FIG. 1 illustrates an embodiment of the present invention.

The method is illustrated in FIG. 1. For the evaluation of absorption effects and of scattering effects, data is used that is acquired from scattering and absorption simulations and/ or measurements of spectra in many different absorption and scattering situations. Hereby, data relating to radiation detectors, absorption and scattering materials and configurations thereof is produced. These configurations are more or less artificial, and only serve for acquisition of this data. This data is stored in a database, and made available for use in surveillance, i.e., in actual identification scenarios, as will be described in detail below.

In the following, the data acquisition will described, and then the method of identifying nuclides using the acquired data will be outlined in detail.

First, spectra are simulated for a given source, response matrices are generated for collecting Monte-Carlo simulated data in a compact form with fast access. Then attenuation and scattering responses are produced, where after a so called feature matrix is generated which—unlike the response matrix is specifically generated for an individual nuclide. It requires the prior knowledge of the lines and intensities of that nuclide and is consequently generated after a nuclide identification algorithm has provided a basic analysis of the underlying spectrum. After having set up a feature matrix, information of the features is extracted from the matrix. Once the features are known, an artificial spectrum can be constructed solely based on simulated data. The reconstruction reprises the measured spectrum in very high detail.

In detail, the method according to an embodiment of the invention is carried out as outlined in the following, in a first step, response matrices related to a detector are simulated. The response principle is explained below.

A response matrix R is an m n field of numbers that relates the detector answer in channel i, (with i∈{1, . . . m}) with the energy of the irradiation. The latter is the incident energy that excites the detector material. Incoming radiation, that is typically a particle with energy $E_{incident}$, may experience a) complete absorption in the detector material, leaving its total energy $E_{Detected}=E_{Incident}$ inside the detector material, b) a partial absorption, thus depositing an energy amount $E_{Detected}<E_{incident}$, or c) pass through the detector without deposition of energy. Furthermore, it is possible that radiation that passed the detector is reflected by surrounding material, causing a separate absorption cycle. The response matrix R is therefore the representation of the physically deposited energy in a detector. In other words, the response matrix R is representative of the translation from the original irradiation energies into the spectral picture the detector makes out of it.

In this embodiment of the invention, the response matrices are simulated with radiation transport codes as described in Geant4. Geant4 is a software toolkit for the simulation of the passage of particles through matter, and is described in S. Agostinelli et al., Nuclear Instruments and Methods in Physics Research Section A: Accelerators, Spectrometers, Detectors and Associated Equipment, Volume 506, Issue 3, 1 Jul. 2003, Pages 250-303, as well as in Allison, J., et al, IEEE Transactions on Nuclear Science 53 No. 1 (2006) 270-278. Those codes use a Monte Carlo approach to render particle and wave trajectories. Based on the geometrical and physical model of a detector various absorption and scattering scenarios are simulated in this way.

According to this embodiment of the invention, the following procedure is implemented to establish a response matrix R:

First, a distributed source is defined with monoenergetic line emission having an energy $E_i$.

Starting with channel i=1, an energy emission of $E_1$=3 keV is simulated, which produces a simulated spectrum $R_1(E)$ for this single energy. This function $R_1(E_1)$ is a histogram of the energy interval $[E_1$=1 keV, $E_N$=3072 keV$]$.

Then, the emission energy is increased by discrete energy intervals dE, and the simulation is repeated to generate further spectrum functions for each further channel $R_i$. (E) with i=1, 2, . . . , 1024, with an irradiation energy of $E_{1024}$=3072 keV.

Thus, with this procedure we obtain N=1024 functions $R_i$. with i=1, . . . , 1024 that represent the system responses to the incident energies E=1 keV, . . . , 3072 keV. These functions can be represented as a matrix, with the concrete dimensions N N where N=1024:

$$DfdR = \begin{pmatrix} R_1(E_1) & R_2(E_1) & \ldots & R_1(E_1) \\ R_1(E_2) & R_2(E_2) & \ldots & R_1(E_2) \\ \ldots & \ldots & \ldots & \ldots \\ R_1(E_N) & R_2(E_N) & \ldots & R_N(E_N) \end{pmatrix} \quad (1)$$

Using this matrix introduces a crucial computational advantage, as once the matrix has been derived, no further Monte-Carlo simulation is needed. Therefore, response matrices provide very fast access to simulated data and can also be used within handheld devices with less memory or CPU power than a traditional system used for Monte-Carlo programs.

The response matrix R can be used to create a spectrum δ, once the emission energies E and their intensities $ω_i$ are known, $$\delta(E) = \sum_i \omega_i R_i(E) \cdot Df \quad (2)$$

This spectrum δ still lacks the statistical characteristics of the detector, e.g., its resolution. To include the detector resolution the spectrum is folded with an appropriate function ρ(E) that contains the resolution information of the system under consideration, $$\zeta(E) = \delta(E) \otimes \rho(E) \quad (3)$$

Alternatively, the columns of R can be folded previous to the application of equation (2).

Figure 2A:
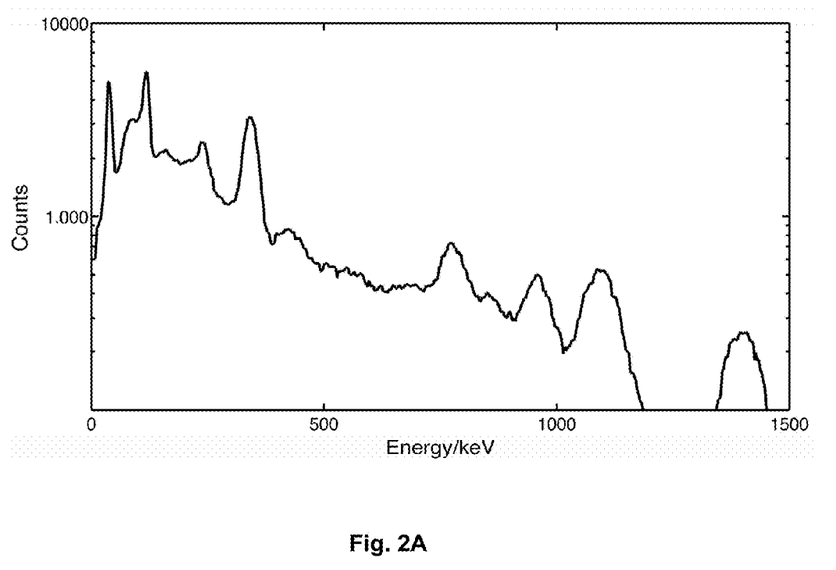
FIG. 2A is a graph showing a typical real measurement of Europium Eu-152 using an NaI detector.
Figure 2B:
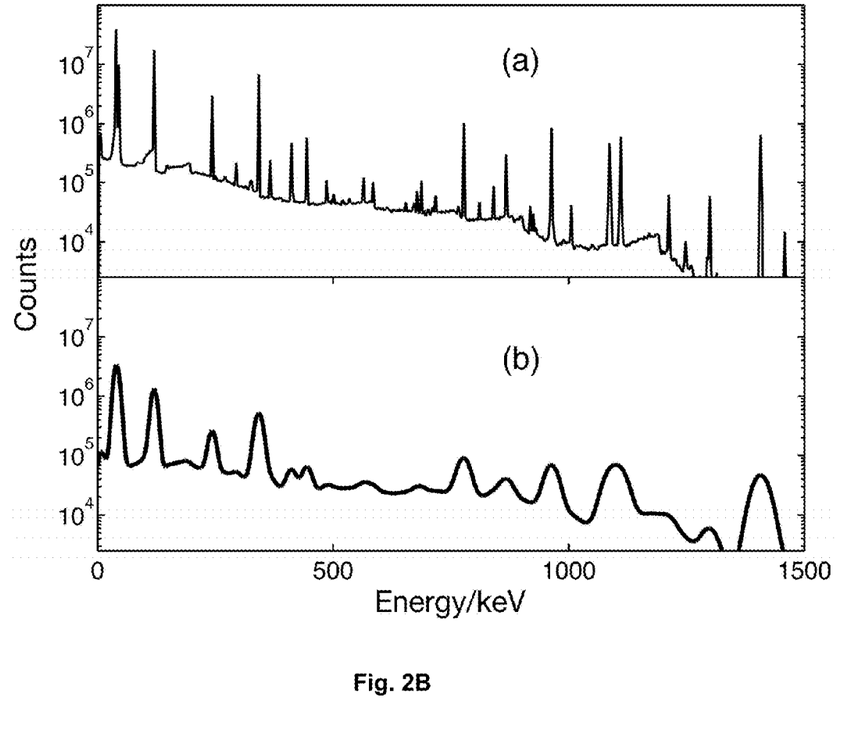
FIG. 2B is a graph showing an example of two stages of a simulation procedure.

FIG. 2B shows both, a simulation based on the non-folded data and a spectrum generated by including the intrinsic detector resolution ρ. In particular, FIG. 2B is an example of two states of the simulation: the upper spectrum labeled with (a) is a Europium Eu-152 spectrum simulated by using the (ideal) delta shaped response of the detector, together with the energy and intensity data from the database. This artificial spectrum was obtained by equation (2). Labeled with (b) is the same spectrum now including the intrinsic detector resolution according to equation (3). It is to be noted that there are still differences between the folded simulated spectrum in FIG. 2B (b) and the real measurement displayed in FIG. 2A, which shows a typical measurement of Europium Eu-152 using an NaI (sodium iodide) detector whereby 512 channels are shown in this spectrum with each channel reflecting an energy of 3 keV, thus covering an energy range from 0 keV to 1536 keV.

Any material along the path between source and detector may interact with the radiation and change its energy. Two accompanying mechanisms may occur, i) absorption in the material or ii) scattering in the material. While absorption reduces the transmission of certain energies, scattering just shifts specific energies to lower levels. Both processes change the detector spectrum significantly.

Figure 3:
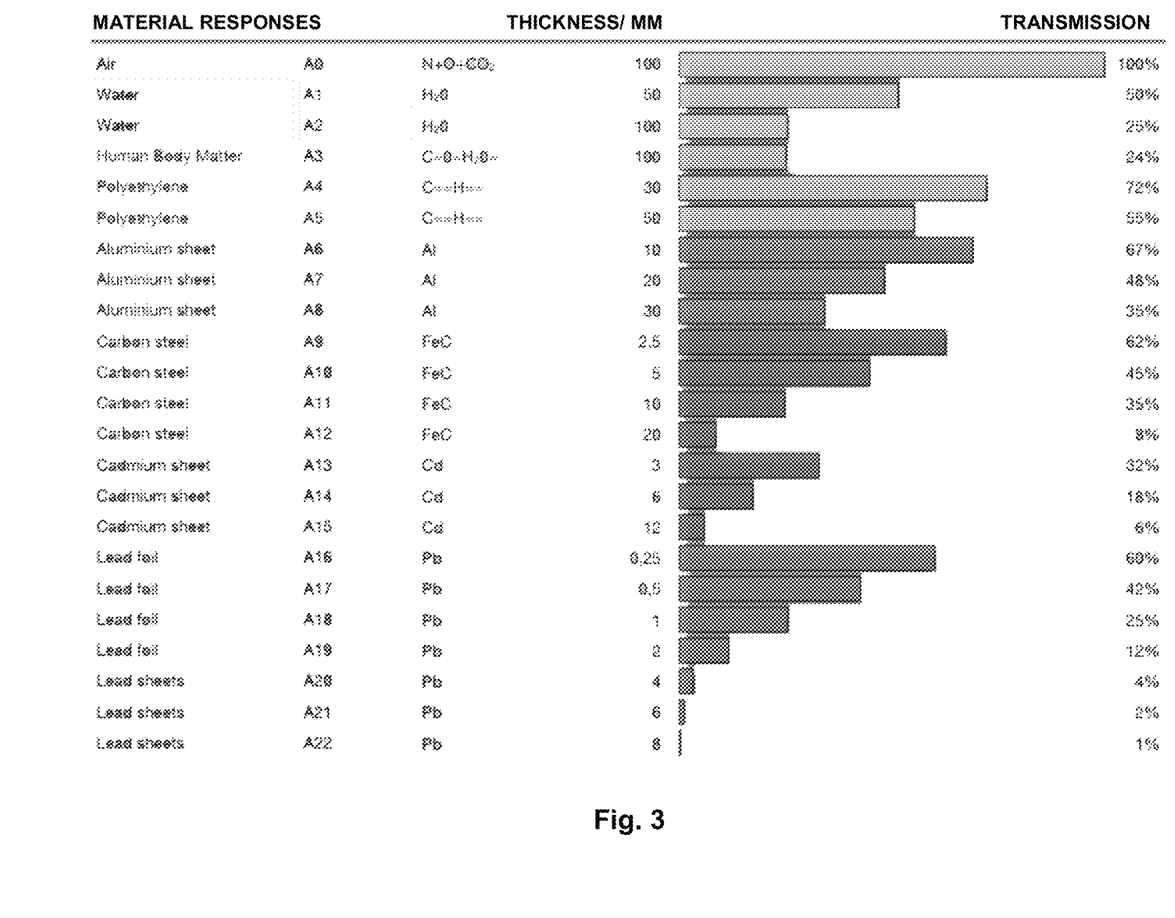
FIG. 3 is an overview of various absorption response matrices.

Following the simulation procedure outlined above, a set of absorption responses $A_0$; $A_1$; $A_2$; $A_3$; $A_4$ ... ; $A_{21}$, $A_{22}$ is created with absorbers that cover the whole range of attenuation from 100% transmission to <1% transmission.

An overview of the used materials is depicted in FIG. 3 which shows an overview of absorption response matrices wherein each matrix was simulated with Geant4 and a suitable detector geometry.

As an example, the third absorption matrix reads:

$$A_3 = \begin{pmatrix} A_{31}(E_1) & A_{32}(E_2) & \ldots & A_{3N}(E_N) \\ A_{31}(E_2) & A_{32}(E_2) & \ldots & A_{3N}(E_2) \\ \ldots & \ldots & \ldots & \ldots \\ A_{31}(E_N) & A_{32}(E_N) & \ldots & A_{3N}(E_N) \end{pmatrix} \quad (4)$$

Note the double indexing, distinguishing type of attenuation and columns.

Parallel to the absorption responses, a scattering response matrix is simulated. This matrix is referred to as M throughout the description. Geant4 allows to keep track of all physical processes that lead to a specific event, and the matrix M is therefore simulated by implementing a series of rules that recover only those attributes in the response that are specifically caused by scattering. In this embodiment of the invention, the scattering material is defined to be an artificial mixed material of carbon and water, in order to reflect the most common scatterer for applications to use the inventive method.

As to the construction of the feature matrix it should be noted that several techniques are already known that can be used to identify the primary source from the base spectrum $\mu(E)$: typically a peak search or a pattern matching is applied to obtain the corresponding information. In the embodiment, the primary source is already known, e.g., retrieved by one of the previous methods.

Further, in the embodiment, a line catalogue containing all necessary peak positions $\epsilon_i$ and peak intensities $E_i$ is used so that formula (2) can be used to construct artificial spectra for all nuclides in the database. The line catalogue data is based on the Evaluated Nuclear Structure Data File (ENSDF) (for further details see e.g. G. Audi et al., The 1995 update to the atomic mass evaluation, Nucl. Phys., 595: 409-480, 1995).

Applying the formulas (2) and (3) simulated spectra for each absorption response matrix are acquired, denoted $\xi_{A0}$, $\xi_{A1}, \ldots, \xi_{A22}$:

$$\xi_{Ax} = \left(\sum_i \omega_i A_{xi}\right) \otimes \rho(E) \quad (5)$$

x being the index that defines the number of the absorption matrix. The simulated spectra are combined as column vectors into a new matrix $$\tilde{F} = (\xi_{A0}, \xi_{A1}, \ldots, \xi_{A22}) \quad (6)$$

Alternatively, instead of using simulations, a spectra set composed of measurements can be used. However, the advantage of this embodiment is, that it does not need prior calibration measurements, as this part of the absorption composition is replaced by simulations. In the next step, the whole content of the scattering matrix is added to the feature matrix $\tilde{F}$ $$F = (\tilde{F}, M_1, M_2, \ldots, M_N) \quad (7)$$

where $M_1, \ldots, M_N$ are the column vectors of the scattering matrix M. The resulting feature matrix F has the dimension (N+23) N. To minimize the number of rows required to describe the scattering, the scattering effects are included by selecting 10 assorted scatter contributions from the matrix M at following energies: 50 keV, 100 keV, 200 keV, ..., 900 keV, 1000 keV.

Figure 4:
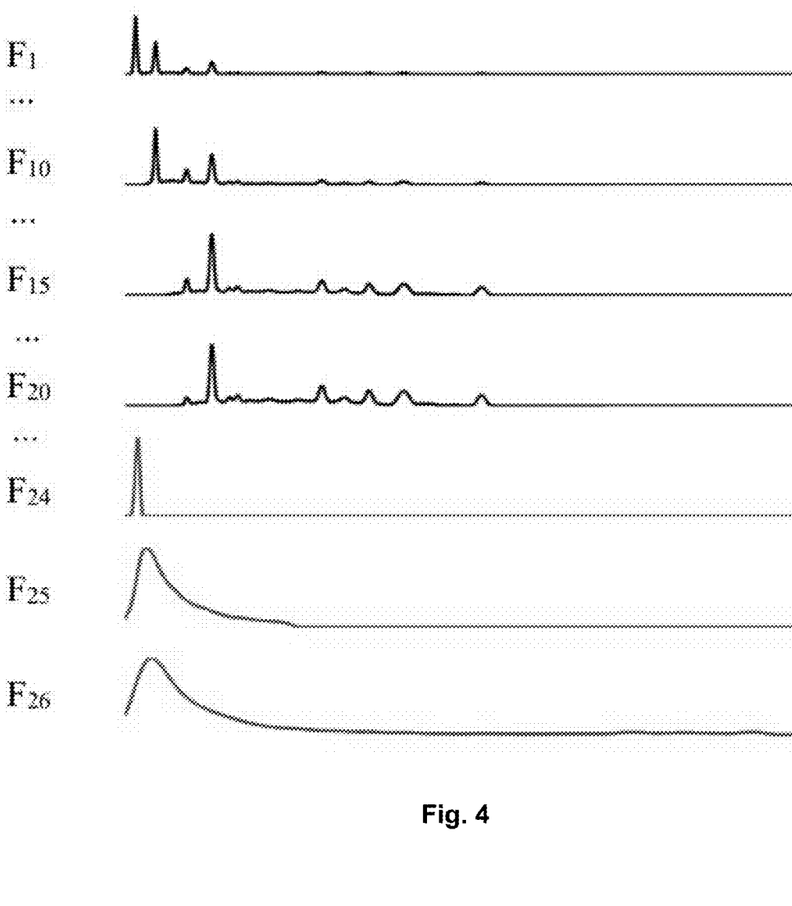
FIG. 4 shows the rows of a feature matrix.
Figure 5:
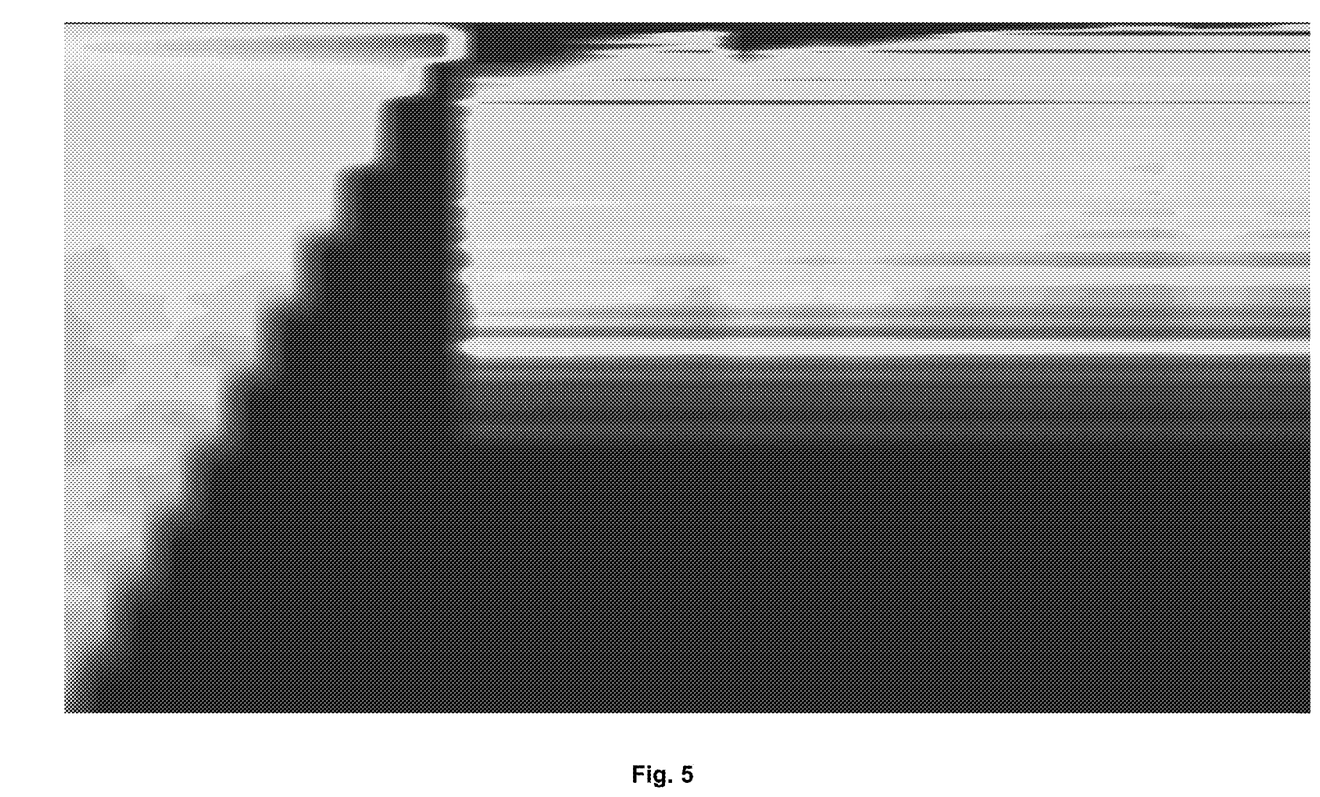
FIG. 5 is a waterfall diagram of the feature matrix shown in FIG. 4, wherein the first ten columns reflect the scattering, followed by 22 columns of different Europium shielding variants.

FIG. 4 shows details of the feature matrix F for Eu-152, a nuclide with multiple lines that is widely known as a test source. Rows of the feature matrix F are displayed, where each row has a length of 1024. $F_1$ reflects the nearly unshielded spectrum. $F_{10}$, $F_{15}$, $F_{20}$ represent examples of different shielding and $F_{24}$, $F_{25}$, $F_{26}$ represent three different scatter traces. In this case the feature matrix F is a 26 1024 matrix. An graphical representation of the complete matrix F can be found in FIG. 5 which is a so-called waterfall diagram of the feature matrix F. The first ten columns reflect the scattering, followed by 22 columns of different Europium shielding variants. The absorption alters the spectrum by reducing the intensities of lines with low energies. If the absorption is sufficiently strong, lines are removed from the spectrum due to this effect, as can be seen from the slices F10 and F15. Consequently, this intensity balance is different for all 23 different absorption cases. The additional scattering is also depicted in FIG. 4. Scattering acts as big bunch of continuous radiation located also in the low energy area and depends on energy of the scattered emission.

Now it will be described how to use the feature matrix F in actual measurements of radiation, e.g., in surveillance scenarios. Thus, the objective of feature matrix F is to retrieve new information about the measured spectrum $\mu(E)$. This is done by finding the most probable combination of feature matrix rows that provides the best fit to the measured spectrum $\mu(E)$. Mathematically, an inversion problem is to be solved. Several methods can be used to estimate this most probable combination: Standard least-squares techniques, non-negative least-squares inversion, or genetic algorithms.

In one embodiment of the invention, the non-negative least-squares inversion method as been implemented. Basically, an operator $\hat{L}$ is defined to be the non-negative least-squares operator which solves the inversion problem of the feature matrix F, $$\alpha = \hat{L}[F]\mu \quad (8)$$

yielding result vector $\alpha$ that contains the numerical factors leading to the most probable combination of feature matrix rows to reproduce spectrum $\mu(E)$. The vector $\alpha$ may be interpreted as a scatter and absorber spectrum, or in general as a material spectrum. Mathematically, it is the projection of the measured spectrum $\mu(E)$ onto the space spanned by the rows of the feature matrix F as obtained by the simulation method as described above.

Figure 7:
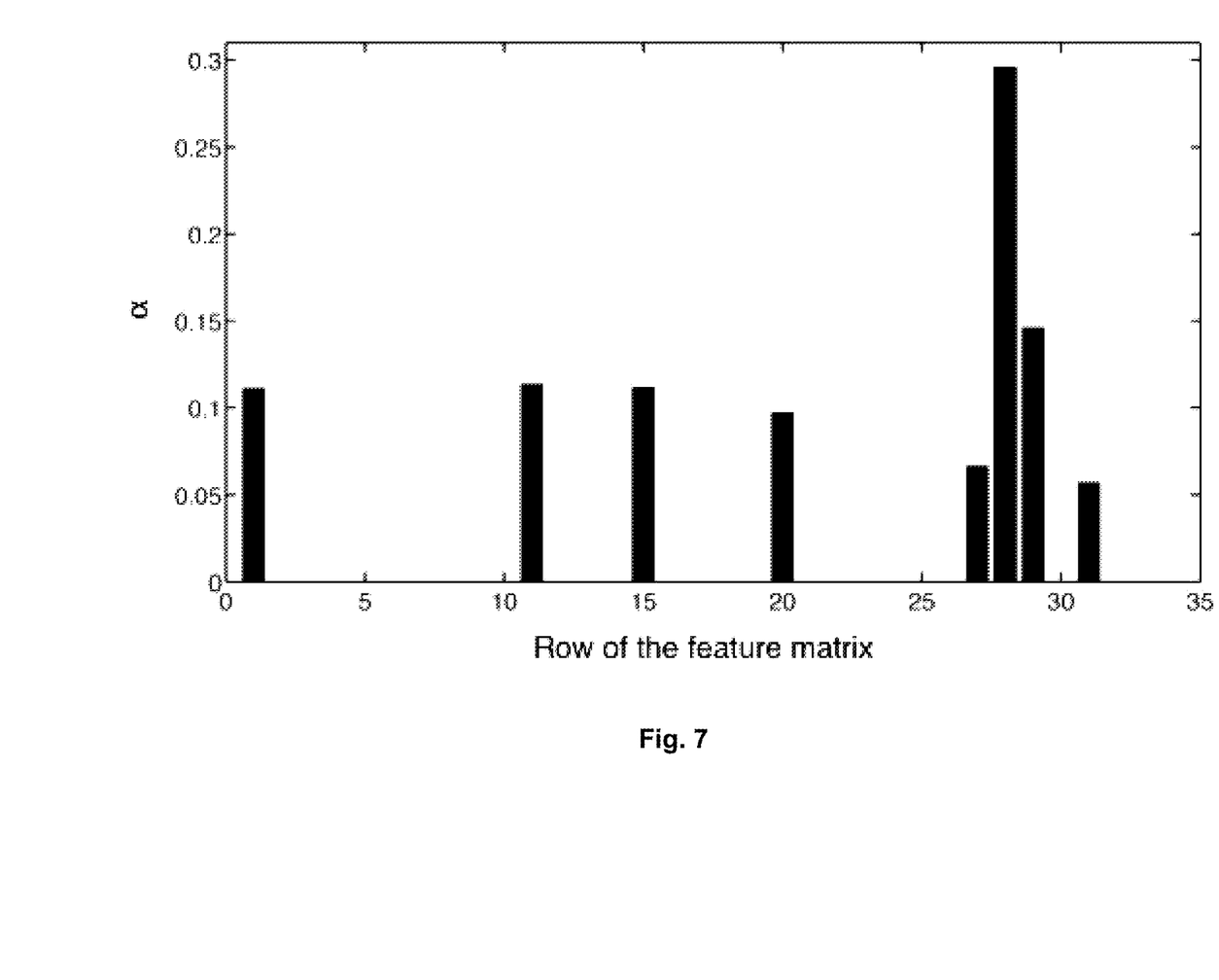
FIG. 7 shows the result of Eq. (6) for the reference Europium spectrum.

Further details of the source being represented by the values of a can be seen in FIG. 7, wherein the result for vector $\alpha$ is shown for a Europium Eu-152 reference spectrum. In FIG. 7, it can be seen that a minor absorption feature and three intense absorption effects are found up to feature number 20. Scattering composes the features from 24 to 34, where a combination of different scatter contributions appears. From that result it can be deduced that a) there is a mix of absorbers present, with a high probability of a strong absorber being cadmium or lead. For a better understanding of this interpretation, the entries of the table in FIG. 3 should be compared with the corresponding a factors in FIG. 7. The first 23 rows reflect the influences of the materials $A_i$. Rows 24 to 34 correspond to the scattering influence of the 50 keV up to 1000 keV, and as far as the rows 27, 28, 29 appear to contribute a maximum, the scattering is a complex composition of scattered photons of the energy range from 300 keV to 500 keV.

Then, a synthetic (simulated) spectrum s(E) is reconstructed from the parameter α:

$$s(E) = F\alpha \quad (9)$$

Figure 6:
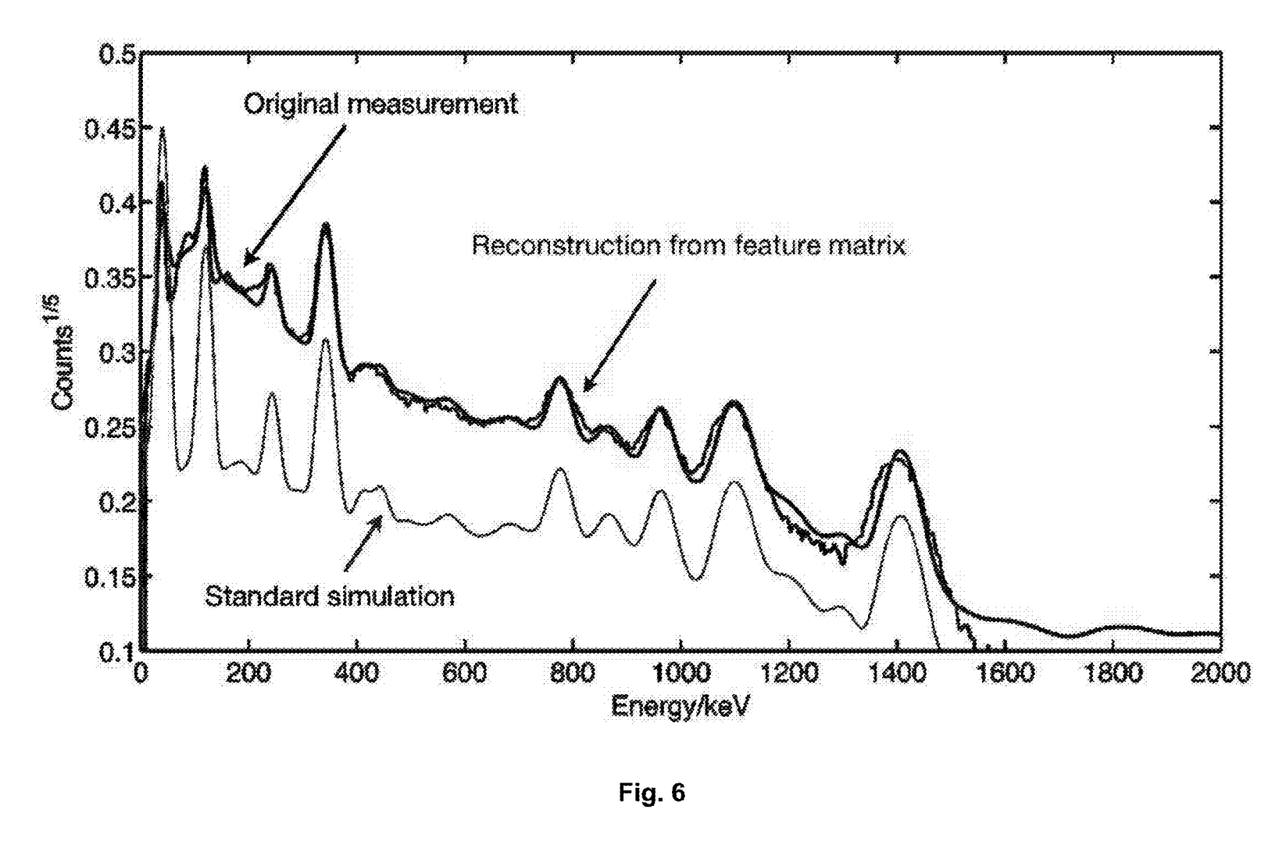
FIG. 6 shows a reconstructed synthetic spectrum in comparison with the measurement and the standard simulation technique.

This synthetic spectrum s(E) should be the best fit to the measurement using the mathematical basis vectors spanned by F. Of course, the most important verification of this simulation is a direct comparison with the originally measured spectrum μ(E). This is shown in FIG. 6, were the reconstruction s(E), the original measurement μ(E) and the standard simulation st(E) are compared. Typically, the approach according to the embodiment of the invention reproduces the measurement with a great detail. The peak intensity ratios are far better resolved than with the standard simulation.

Figure 8:
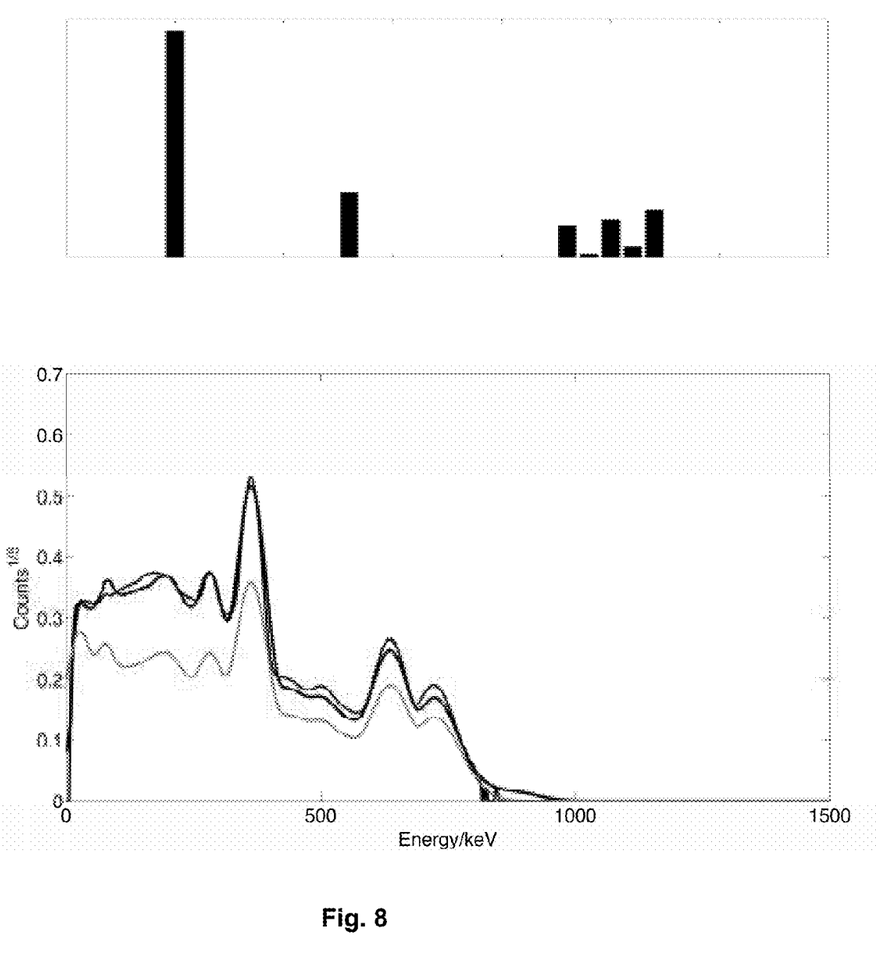
FIG. 8 shows a Iodine I-131 measurement with the source enclosed inside an aluminum and cadmium housing.
Figure 9:
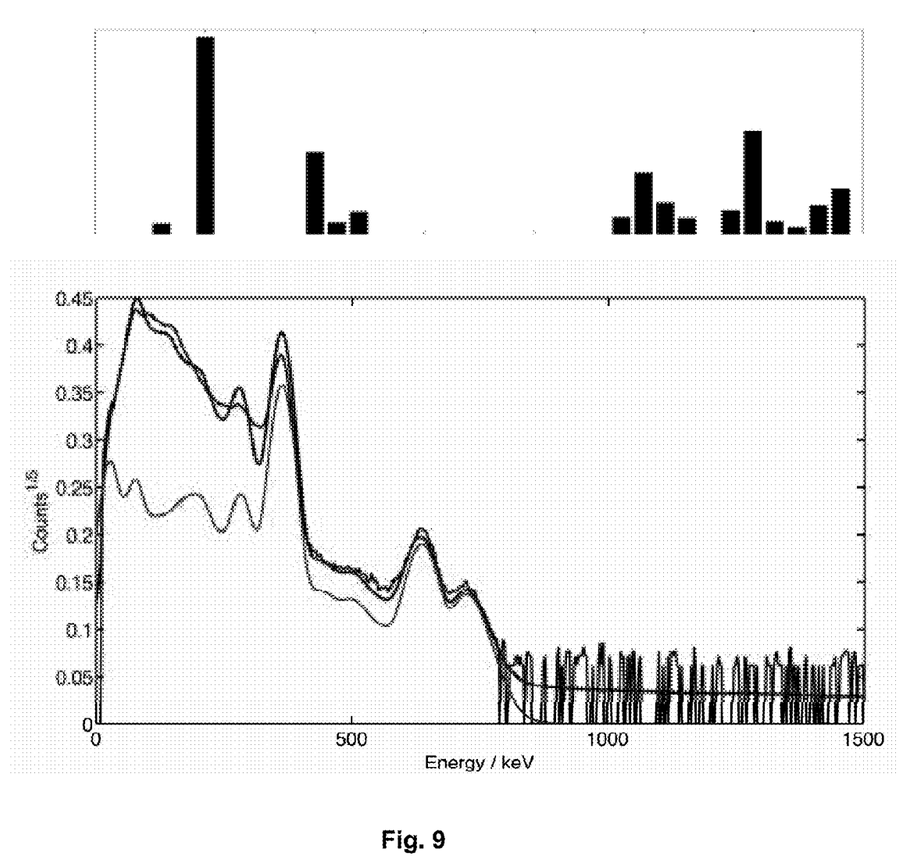
FIG. 9 shows a Iodine I-131 measurement wherein the source was placed in a phantom compared with our reconstruction and the standard simulation.

In the following, several sample cases where the technique has been applied are illustrated. In FIG. 8, a Iodine I-131 measurement is shown with the source enclosed inside an aluminum and cadmium housing, and in FIG. 9 a Iodine I-131 measurement is shown where the source was placed in a phantom compared with a reconstruction and the standard simulation. Iodine I-131 is a medical isotope widely used for radiologic diagnostics and treatment. Two cases are discussed here: in FIG. 8 the radioactive source was positioned in a cylindrical containment composed of aluminum and cadmium layers. It can be seen from the material spectrum, that the absorber follows straightforwardly from our analysis. Moreover, there is only a slight amount of scattering coming from that source. In contrast, FIG. 9 shows I-131 within the same aluminum container but additionally inside a human body phantom. As a matter of fact, the radiation scattering is increased dramatically, which can be seen from the low energy area. The reconstruction yields an α material spectrum with clearly emphasized scattering. The aluminum absorber is still found, but an additional minor absorption from the phantom material arises, too. Therefore, based on the material information α that leads to above results, we can clearly decide that the medical sources were indeed enclosed in a human body, providing a high amount of scattering or within a steel or aluminum cylinder.

The above described embodiment of the inventive method provides a rapid assessment of separate shielding cases as shown in FIG. 9. Two different housing types were used, one with aluminum and the other one with lead. The technique separates both cases very well.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities. To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method for identifying at least one radiating source, including at least one nuclide, which is at least partially enclosed by a predetermined material, the method comprising:
   estimating at least one radiating source in a measured spectrum (μ(E)) using a predetermined gamma spectroscopic device;
   comparing the measured spectrum with absorption spectra and scattering spectra from a database comprising data representing spectra for a plurality of absorption scenarios and for a plurality of scattering scenarios related to the at least one estimated source;

determining, on the basis of the compared scenarios, information ($\alpha$) relating to the material (x) by which the radiating source is at least partially enclosed.

2. The method according to claim 1, wherein an absorption scenario is representative of a type and of a configuration of an absorbing material (x), and a scattering scenario is representative of a type and a configuration of a scattering material.

3. The method according to claim 1, wherein an absorption spectrum is described by a vector ($\xi_{Ax}$) calculated on the basis of a response matrix ($A_x$) representative of the respective absorption material (x), and of a response function (p) representative of the gamma spectroscopic device.

4. The method according to claim 1, wherein the standard nuclide identification procedure is based on one of a peak search method and a pattern matching method.

5. The method according to claim 4, wherein the data comprised in the database representing the spectra is in the form of feature matrices (F), wherein a feature matrix (F) is composed by a plurality of the vectors ($\xi_{A0}, \xi_{A1}, \ldots \xi_{A22}$) descriptive of the absorption spectra, and rows of a scattering matrix (M) representative of the scattering material.

6. The method according to claim 5, wherein the information ($\alpha$) is determined by finding the one combination of feature matrix (F) rows that provides the best fit to the measure first spectrum ($\mu(E)$).

7. The method according to claim 6, wherein the one combination of feature matrix rows is found by solving an inversion problem, in particular, by applying one of a standard least-squares technique, a non-negative least-squares inversion, and a genetic algorithm.

8. The method according to claim 7, wherein an operator (L) is defined to be a non-negative least-square operator which solves the inversion problem of the feature matrix (F) resulting in a result information vector ($\alpha$), the result information vector ($\alpha$) relating to a scatter and absorber spectrum, in particular, a material spectrum.

9. The method according to claim 1, wherein the data representing the spectra is obtained by simulation procedures.

10. The method according to claim 1, wherein the gamma spectroscopic device is a scintillation radiation detector, in particular a handheld detector.

11. A computer readable medium encoded with instructions used by a processor to implement the method of claim 1.

12. The method according to claim 1, wherein the gamma spectroscopic device is a handheld scintillator radiation detector.

13. A computer readable medium encoded with a database used by a processor to implement the method of claim 1, the database comprising data (F) representing spectra for a plurality of absorption scenarios and for a plurality of scattering scenarios of the at least one estimated source.

14. The computer readable medium of claim 13, wherein for at least one absorption response matrix a simulated spectrum is acquired.

15. The computer readable medium of claim 14, wherein for at least one scattering response matrix, (M) a simulated spectrum is acquired.

16. The computer readable medium of claim 15, wherein the simulation procedure involves simulating at least one response matrix with radiation transport code, the radiation transport code using a Monte Carlo approach to render particle and wave trajectories, wherein the at least one response matrix is a representation of the physically deposited energy in the gamma spectroscopic device.

17. The computer readable medium of claim 16, wherein a plurality of absorption response matrices is simulated in the simulated procedure with absorbers that cover a range of attenuation from 100% transmission to less than 1% transmission.

18. The computer readable medium of claim 17, wherein a plurality of scattering response matrices are simulated in the simulation procedure.

19. The computer readable medium of claim 18, wherein the plurality of absorption and scattering scenarios are simulated based on a geometrical and physical model of the gamma spectroscopic device.

20. The computer readable medium of claim 19, wherein the physical and geometrical model of the gamma spectroscopic device includes the resolution of the scintillation radiation detector without electronics, scattering between the scintillation radiation detector and a source; absorption by attenuating materials, and/or the geometry of the source and the scintillation radiation detector.

21. The computer readable of claim 20, wherein the data comprised in the database representing the spectra is in the form of feature matrices (F), wherein a feature matrix (F) is composed by a plurality of column vectors ($\xi_{A0}, \xi_{A1}, \ldots \xi_{A22}$) and column of a scattering matrix (M) representative of the scattering material.

* * * * *